May 3, 1966  A. J. SPEEGLE ETAL  3,248,930
APPARATUS FOR TESTING THE PERMEABILITY OF MATERIALS
Filed March 26, 1965  2 Sheets-Sheet 1

INVENTORS
A. J. SPEEGLE
RICHARD F. BAILEY
BY Burns, Doane, Benedict, Swecker & Mathis
ATTORNEYS

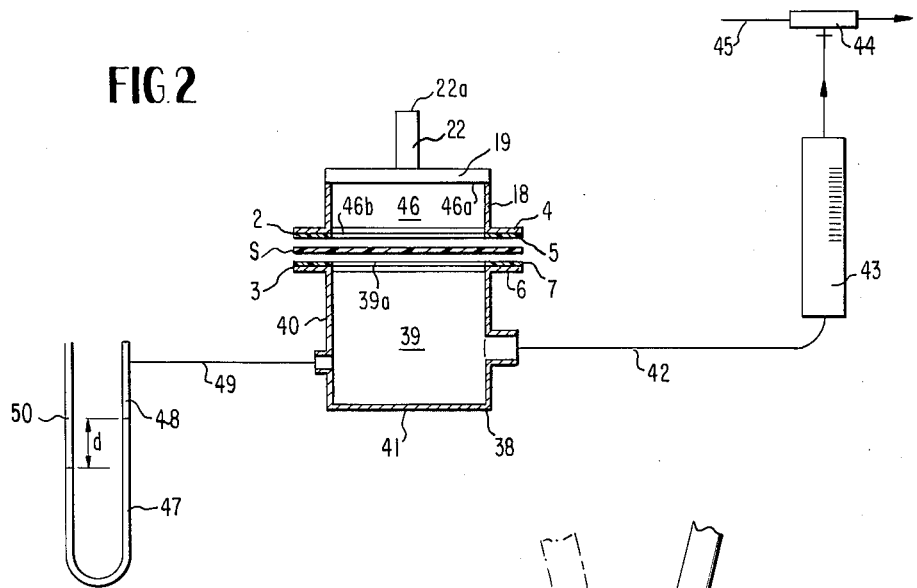
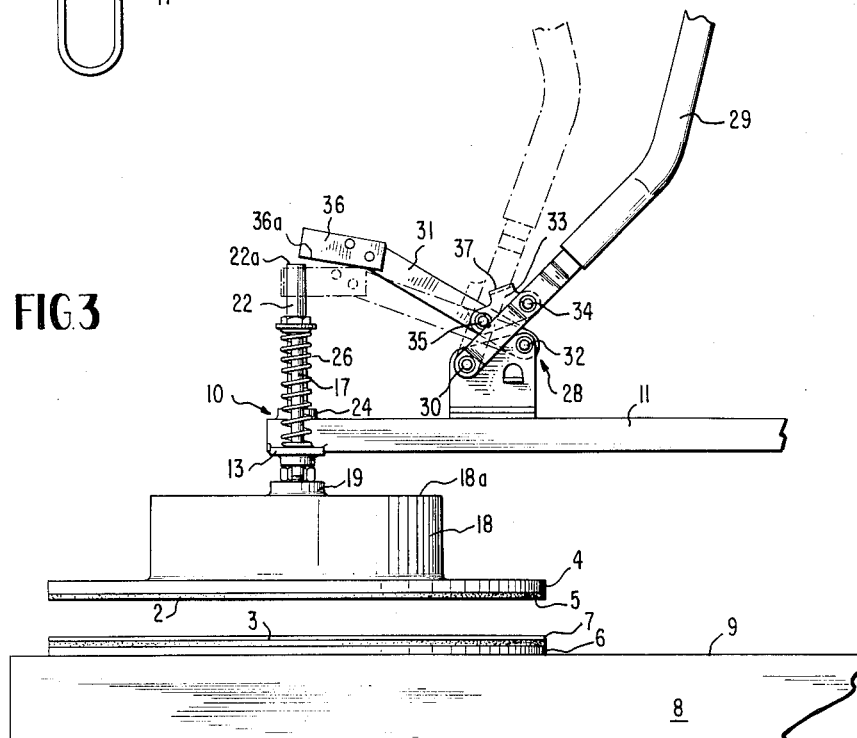

United States Patent Office 3,248,930
Patented May 3, 1966

3,248,930
APPARATUS FOR TESTING THE PERMEABILITY
OF MATERIALS
A. J. Speegle and Richard F. Bailey, Duncan, Okla., assignors to Halliburton Company, Duncan, Okla., a corporation of Delaware
Filed Mar. 26, 1965, Ser. No. 443,000
3 Claims. (Cl. 73—38)

This invention relates to an apparatus for testing the permeability of materials. In particular it relates to an apparatus specifically adapted to test the permeability of flexible materials such as fabrics.

Many devices for handling and conveying pulverulent material employ permeable, and sometimes flexible, surfaces as a mechanism to both support the material and inject air or gas into the material so as to cause its fluidization and thus prevent caking and facilitate material flow.

Such permeable surfaces are often times of considerable areal extent. In fabricating pulverulent material handling devices including such aerating surfaces, it is desirable from a quality standardization view point to test the permeability of the aerating surfaces to insure a proper degree of uniformity of air injection.

While a variety of devices have previously been developed for testing the permeability of materials, these devices, in general, have been characterized by structural or operational defects which limit their utility in the large-scale testing of permeable materials.

In particular, previously known permeability testing devices have been characterized by structural complexity and an ofttimes cumbersome mode of operation. The structural characteristics of many of these devices have been such as to limit the material area being tested to a small areal extent.

Many previously known permeability testing devices have not afforded direct observation of a portion of a sample being tested, including the periphery of the sample adjacent a clamped sample area. Thus, in many instances it has not been possible to verify whether or not a flexible sample was secured in a properly taut condition and whether or not the sample area being tested was free of defects.

Another significant disadvantage of many previously known testing devices has involved the difficulty of clamping a sample for a testing operation without unduly crushing or damaging a portion of the sample.

Recognizing the need for an improved permeability testing apparatus, it is an object of the present invention to provide a permeability testing apparatus, which substantially obviates or minimizes defects such as those previously noted.

It is a particular object of the invention to provide such an improved apparatus which includes means for positively clamping a sample while maintaining a predetermined spacing between clamping surfaces so as to positively control sample crushing and thereby prevent sample damage.

Yet another object of the invention is to provide such an improved apparatus which is characterized by structural simplicity, operational ease, and an ability to perform in rapid sequence a large number of permeability tests, each of which encompasses a relatively large sample area.

A still further object of the invention is to provide such an improved apparatus which affords direct observation of the portion of a sample being tested and the periphery of this sample portion adjacent a clamped sample margin.

Still another object of the invention is to provide a unique operating mechanism for sample clamping means, which mechanism contributes to high-speed, sampling operations.

It is likewise an object of the invention to provide such an apparatus which includes an arrangement for supporting sample clamping means and operating means for the clamping means so as to avoid interference with sampling operations and enable a sample to be easily manipulated and positioned.

It is also an object of the invention to provide an arrangement for supporting a movable sample clamping component so as to insure stabilized and aligned movement of this component while it is being moved into clamping engagement with a sample.

In accomplishing at least some of the foregoing objectives, there is presented through this invention an apparatus for testing the permeability of materials, which apparatus includes first, generally annular clamping means and second, generally annular clamping means. Means are included in the apparatus for supporting one of these clamping means for movement toward and away from the other of the clamping means. Resilient means yieldably urge this one clamping means away from the other clamping means. Lever means incorporated in the apparatus is adapted to move the one clamping means toward the other clamping means. A locking means is adapted to prevent this lever means from moving the one clamping means toward the other clamping means beyond a predetermined position.

A chamber means included in the apparatus is connected with the other clamping means. This chamber means, in combination with the other clamping means, defines a closed flow path adapted to communicate with and extend away from a sample of material, the permeability of which is to be tested. Means are included in the apparatus to withdraw fluid from the chamber means, to measure the rate at which fluid is withdrawn from the chamber means, and to measure a fluid pressure differential across the sample of material when the sample is clampingly engaged on opposite sides by the first and second clamping means.

Means is also incorporated in the apparatus which defines an open ended passageway connected with the one clamping means and affording direct observation, through the open end thereof, of the periphery of the sample adjacent the interior of the one clamping means and adjacent an annular portion of the sample which is clamped between the first and second clamping means.

Other individually significant facets of the invention include a mechanism for supporting the one clamping means, which mechanism is characterized by a cantilever frame, guide means for the one clamping means, and a coil spring-type resilient means which is incorporated with the guide means.

A still further individually significant facet of the invention involves structural characteristics of the lever means as they are disposed in combination with the aforesaid cantilever frame means.

In describing the invention, reference will be made to a preferred embodiment illustrated in the application drawings.

In the drawings:

FIGURE 2 is a schematic, flow diagram showing sample clamping means in sectioned elevation and illustrating the manner in which flow through a sample is handled, regulated and measured; and FIGURE 3 is an enlarged, fragmentary, side elevation view of a portion of the FIGURE 1 apparatus illustrating structural details of the lever means which is employed to actuate movable clamping means.

Figure 1:
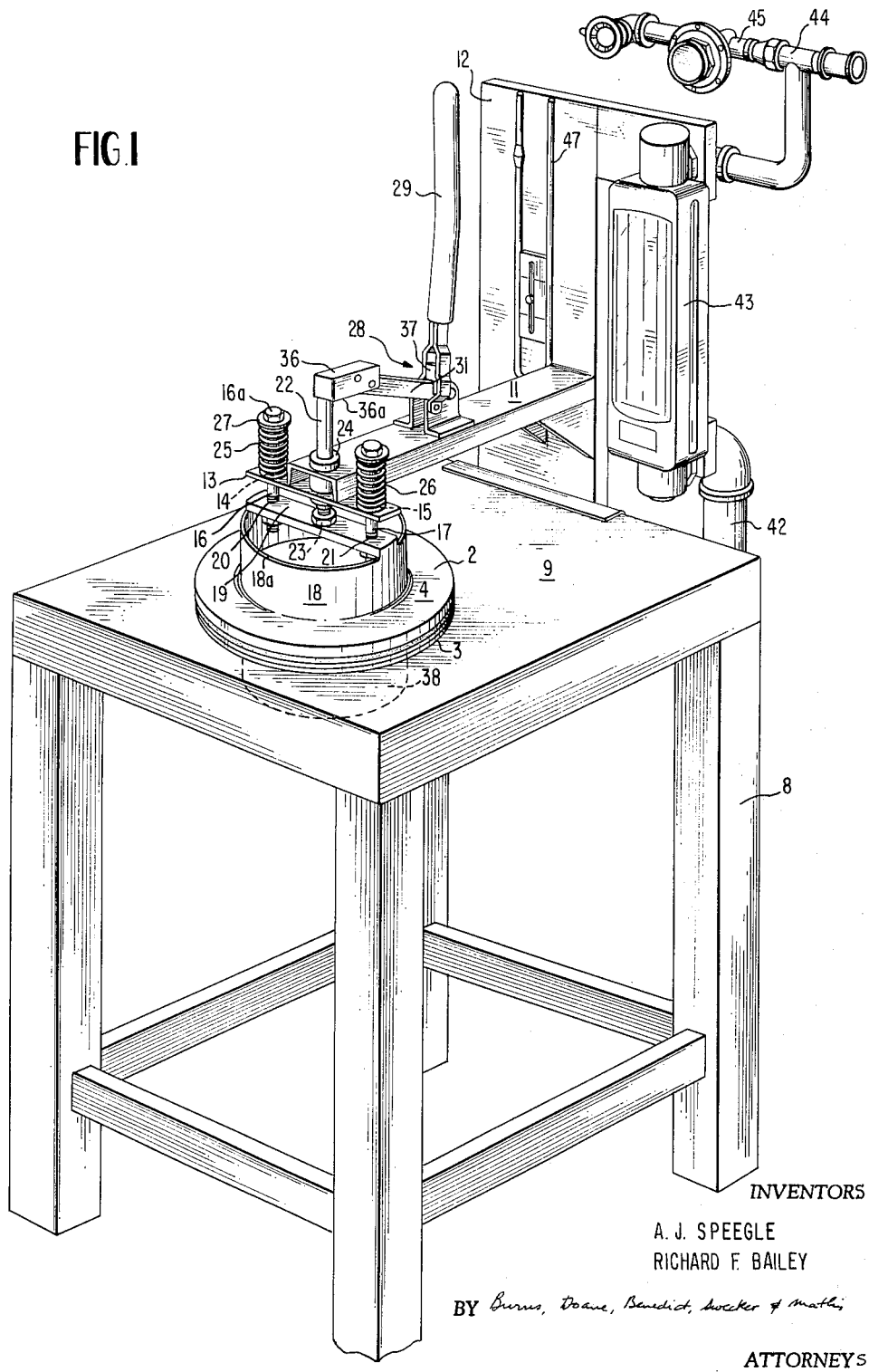
FIGURE 1 is a schematic, perspective view of a preferred embodiment of a permeability testing apparatus embodying characterising features of this invention.

FIGURE 1 schematically illustrates the overall structure of a permeability testing apparatus 1 which includes advantageous attributes of the present invention.

Testing apparatus 1, as shown in FIGURES 1, 2 and 3, includes, as principal components, first generally annular clamping means 2 and second generally annular clamping means 3.

First annular clamping means 2 comprises an annular, metallic backup plate 4 and an annular, resilient gasket 5. Gasket 5, which may be fabricated from elastomeric material such as rubber, may be co-extensive with backup plate 4, with gasket 5 and plate 4 both extending generally horizontally.

Second annular clamping means 3 similarly includes a metallic and annular backup plate 6 and a superposed resilient gasket 7 which may be identical to gasket 5. Plates 4 and 6 and gaskets 5 and 7 may all be of substantially identical configuration and size and horizontally disposed as illustrated in FIGURES 2 and 3.

Gaskets 5 and 7 may be secured to their respective backup plates by conventional fastening means such as adhesive.

Second claming means 3 is supported at a fixed, predetermined position by a table 8. The top 9 of table 8 provides a surface which surrounds and projects horizontally outwardly from the second clamping means 3.

Supporting means 10 supports the first clamping means 2 for vertical movement toward and away from the second clamping means 3. Supporting means 10 includes channel-like frame member 11 which extends, in a cantilever fashion, horizontally over table top 9 from bracket means 12. Bracket means 12, as shown in FIGURE 1, is secured to and extends upwardly from the table 8.

A plate 13 is secured to the outer free end 11a of the frame member 11 and extends horizontally and transversely of this member. Plate 13 includes a first aperture 14 disposed on one side of the frame member 11 and a second aperture 15 disposed on the other side of this member.

First and second guide rods 16 and 17, respectively, extend vertically upwardly from the clamping means 2 and are connected with this clamping means by a generally cylindrical wall 18 and a transverse bar 19. Bar 19 is secured to the open upper end 18a of the wall 18 by conventional fastening means such as welding. Rods 16 and 17 may be conventionally and threadably secured to threaded apertures 20 and 21 in the bar 19 as schematically shown. Apertures 20 and 21 are disposed in axial alignment beneath the plate apertures 14 and 15, respectively, such that the guide rods 16 and 17 project upwardly and slidably through the apertures 14 and 15 so as to be in guided relationship with the plate 13.

A rod 22 may be threadably secured to a central, threaded aperture 23 in the bar 19 so as to project upwardly from this bar. Rod 22 extends slidably through a guide bushing 24 which intersects and is secured with the interconnected cantilevered frame 11 and transverse plate 13. The upper end 22a of rod 22 defines an abutment, the purpose of which will be hereinafter described.

Resilient means are incorporated in the support means 10 to yieldingly urge the clamping means 2 away from the clamping means 3. This resilient means comprises a first coil spring 25 and a second coil spring 26. Coil 25 encircles a portion of the guide rod 16 which projects above the transverse plate 13. The lower end 25a of the spring 25 abuttingly engages the top of the plate 13 while the upper end 25b of the spring 25 is abuttingly connected with the upper end of the rod 16 by an abutment defining annular washer 27. As illustrated, washer 27 may be conventionally secured by an enlarged, polygonally configured rod head 16a.

Coil spring 26 is secured on a portion of the guide rod 17 which projects above the plate 13 in a manner identical to that in which the coil spring 25 is mounted on the rod 16 as schematically shown in FIGURE 1.

Lever means 28 is provided for moving the clamping means 2 toward the clamping means 3.

Lever means 28 includes a handle 29 connected by a pivot mount 30 to cantilever frame member 11. An actuating lever 31, included in lever means 28, is connected with frame member 11 by another pivot mount 32. A linkage 33 is pivotably connected to the handle 29 and the actuating lever 31 by pivot connections 34 and 35, respectively.

The outer end of actuating lever 31 may be provided with a bar-like end 36 having an undersurface 36a adapted to abuttingly engage the upper abutment end 22a of the rod 22.

As will be apparent by reference to FIGURE 3, pivotal movement of the handle 29 toward the rod 22 will cause the end portion 35 of the actuating lever 31 to pivot downwardly. This counterclockwise movement of the handle 29, viewing the apparatus as shown in FIGURE 3, will move the handle 29 and the lever 31 to the phantom lines position there shown so as to cause the depression or downward movement of the rod 22 as a result of the engagement of the downwardly moving surface 36a with the upper abutment end 22a of the rod 22. This movement of the rod 22 will move the clamping means 2 downwardly toward the clamping means 3.

When the handle 29 is pivoted clockwise, as shown in FIGURE 3, i.e. moved away from the rod 22, the coil springs 25 and 26 will serve to automatically raise the clamping means 2 to a raised, rest position shown in FIGURE 3, spaced above the fixed clamping means 3.

A locking means is included in the apparatus to prevent the lever means from moving the clamping means 2 toward the clamping means 3 beyond a predetermined position.

This locking means comprises an abutment 37 carried by the linkage 33 and disposed between the handle 29 and the actuating lever 31. When the handle 29 is moved to the phantom line, clamp depressing position shown in FIGURE 3, the abutment 36 abuttingly engages a top portion of the lever 31. When this engagement occurs the pivot axes of the pivot connections 30, 35 and 34 are axially aligned. Thus, this engagement, which prevents further pivotable movement of the actuating lever 31 in a downward direction, occurs when the pivot axes 30, 35 and 34 are aligned so as to interlock the lever means 28. This interlocking prevents clockwise or upward pivotal movement of the actuating lever 31 in response to an upward force exerted on the lever end 36 as a consequence of the resilient biasing force of the springs 25 and 26.

When the lever means interlocking occurs, the clamping means 2 will be positioned at the predetermined distance from the clamping means 3. This position may be selectively adjusted by varying the elevation of the frame 11, the elevation of the upper end 22a of the rod 22, the position of the lower surface 36a of the actuating lever 31, or by varying the position of other components of the lever means 28, the table 8 or the supporting means 10 in any of several obvious fashions. This spacing of the clamping means 2 and 3, when the clamping means 2 is in its depressed position may be adjusted in conformance with the thickness and crush-resistant characteristics of a sample to insure that a sample is clampingly and sealingly engaged on opposite sides by the clamping means 2 and 3 without crushing the sample so as to cause permanent damage.

As schematically shown in FIGURES 2 and 3, a chamber 38 is connected with the clamping means 3 so as to define closed flow path 39 extending downwardly away from a sample "S" disposed between the clamping means 2 and 3. Chamber 38 may comprise a cylindrical side wall 40 connected with the clamp backup plate 6 and extending downwardly therefrom. A horizontally extending wall 41 closes the lower end of the flow path 39 while the upper end 39a remains open.

A schematically shown conduit 42 is connected with the side wall 40 and communicates with the flow path 39. Conduit 42 may extend through a conventional flow meter 43 to an eduction or venturi type fitting disposed in a gas or air flow line 45. With pressurized gas or air flowing through the line 45 and supplied from a conventional source, not shown, a vacuum or sub-ambient pressure will be created in the conduit 42 and flow path 39.

The schematically shown velocity meter 43 may comprise any of several commercially available flow meters used to provide a measurement of gas flow through a conduit. One acceptable type of meter operates as an application of Stokes Law.

The cylindrical wall 18, which is connected with and extends upwardly from the backup plate 4, defines a flow path or channel 46 having an upper open end 46a obstructed only to a limited extent by the transverse bar 13. Flow channel 46 terminates at a lower open end 46b in the aperture of the annular seal means 2.

A conventional, fluid pressure measuring mechanism 47 is incorporated in the apparatus 1 as schematically shown in FIGURE 2. This mechanism may comprise, as shown in FIGURE 2, a manometer having a closed leg 48 which communicates through a connecting conduit 49 with the interior flow passage 39 of the chamber 38. The other leg 50 of the manometer is open at its upper end to ambient pressure.

With the structure of the apparatus 1 having been described, its mode of operation will now be considered with reference to a typical permeability testing operation.

In this operation a sample "S" of material, the permeability of which is to be tested, is disposed between the spaced clamping plates 2 and 3. The portion of the sample "S" which extends beyond the periphery of the clamping means 2 and 3 may be supported at least in part by the table top surface 9. With the sample "S" thus positioned, the lever handle 29 is moved to the phantom line position shown in FIGURE 3 so as to depress the clamping means 2 downwardly and clamp the sample "S" between the clamping means 2 and 3. The open upper end 46a of the flow channel 46 affords direct observation of the sample "S" within the interior of the clamping means 2 and allows direct inspection of the junction of the sample "S" with this clamping means. Thus, it can be assured that a sample is evenly and properly clamped so as to verify the accuracy of a permeability measurement. In addition, the sample portion within the annular seal means 2 may be inspected to insure that it is free from defects and is representative of the overall material of the sample.

With the sample thus secured, and with fluid flowing through the line 45, a vacuum or subambient pressure is created in the chamber 39. This subambient pressure will tend to cause a downward flow of air into the passage 46 and through the sample "S" into the chamber 39. This air drawn through the sample "S" will then flow by way of the conduit 42 through the volume meter 43.

With the manometer leg 50 being exposed to ambient pressure and the manometer leg 48 being exposed to the subambient pressure in the chamber 39, the difference in elevation "d" of the height of fluid in the manometer legs will be directly indicative of the difference in pressure in air across the sample "S," i.e. the difference in pressure between air in the passage 46 and air in the chamber 39.

With the readings obtained from the manometer 47 and the flow meter 43, the permeability of the portion of the sample "S" in the aperture of the clamp means 2 and 3 may be computed by conventional formulas. This aperture, in one embodiment, has a cross-sectional area of one-fourth of a square foot such that the computed permeability will be applicable to a relatively large sample area.

As will be apparent, the apparatus 1 may be employed to conduct high speed, sequential testing operations. With gas flowing continuously through the conduit 45 so as to tend to create a continuous vacuum in the chamber 39, a large sample may be manipulated and repeatedly clamped and released so as to obtain, in rapid sequence, a series of permeability measurements reflecting the permeability of several portions of a sample. After each sample portion has been clamped, a comparatively short time will be required for flow conditions to stabilize in the passage 46 and in chamber 39 so as to enable the obtaining of stabilized pressure and flow readings.

With the structure and mode of operation of the apparatus 1 having been considered in detail, the several advantages of the invention have been made apparent.

In summary, principal advantages of the invention include the manner in which the clamping means 2 and cylindrical wall 18 afford direct observation of a sample and the sample clamping zone during each testing operation. Another principal advantage involves the manner in which the lever means in combination with the clamp supporting means 10 enables easy, foolproof, and rapid clamping and releasing of samples for sequential testing operations.

Another principal advantage involves the locking arrangement incorporated in the lever operating mechanism which provides a positively controlled spacing between the annular clamping means while these means are engaged with a sample.

Other significant advantages involve the manner in which the upper clamping means is biased resiliently upwardly and guided so as to provide for the automatic restoring of the upper clamp means to an elevated position and provide for proper alignment of the movable clamping means when it moves into clamping engagement with a sample.

Of some additional significance is the manner in which the fixed, lower clamping means is mounted into relation to a surrounding supporting surface so as to facilitate the support and manipulation of a large sample.

While the invention has been described with reference to a preferred embodiment, those skilled in the permeability testing art and familiar with the disclosure of this invention, may recognize additions, deletions, substitutions and other modifications with reference to the disclosed embodiment which would wall within the purview of the invention as defined in the appended claims.

We claim:
1. An apparatus for testing the permeability of materials, said apparatus comprising:
   first, aperture defining, clamping means;
   second, aperture defining, clamping means;
   means supporting one of said clamping means for axial movement toward and away from the other of said clamping means;
   resilient means yieldably urging said one clamping means away from said other clamping means;
   lever means adapted to move said one clamping means axially toward the other of said clamping means;
   locking means adapted to prevent said lever means from moving said one clamping means toward said other clamping means beyond a predetermined position and simultaneously prevent said resilient means from separating said first and second clamping means;
   chamber means connected with said second clamping means, said chamber means, in combination with said second clamping means, defining a closed flow path adapted to communicate with and extend away from a sample of material, the permeability of which is to be tested;
   means to withdraw fluid from said chamber means;
   means to measure the rate at which fluid is withdrawn from said chamber means;
   means to measure a fluid pressure differential across a sample of material when said sample is clampingly engaged on opposite sides by said first and said second clamping means; and wall means defining a passageway open at opposite ends thereof, connected with said first clamping means, and adapted to afford direct observation of the portion of a sample within the aperture of said first clamping means when said sample is clamped between said first and second clamping means;

one open end of said passageway being wholly unobstructed and adapted to communicate directly with the portion of a sample within the aperture of said first clamping means.

2. An apparatus for testing the permeability of materials, said apparatus comprising:

first, aperture defining, clamping means;
second, aperture defining, clamping means;
means supporting one of said clamping means for movement toward and away from the other of said clamping means and including
    cantilevered, generally horizontally projecting, frame means,
    plate means secured to and extending horizontally and transversely of said frame means, said plate means having first and second apertures disposed respectively on opposite sides of said frame means,
    first and second, generally vertically extending guide rods connected with and projecting upwardly from said one clamping means, each of said guide rods projecting in guided relation through an aperture of said plate means, and
    abutment defining, rod means connected with and projecting upwardly from said one clamping means;
resilient means yieldably urging said one clamping means away from said other clamping means, said resilient means including a pair of coil springs, with each of said coil springs encircling a portion of one of said guide rods which projects above said plate means;
each said coil spring having a lower end engaged with said plate means and an upper end connected with an upper portion of the guide rod which it encircles;
lever means adapted to move said one clamping means toward the other of said clamping means;
locking means adapted to prevent said lever means from moving said one clamping means toward said other clamping means beyond a predetermined position;
chamber means connected with said second clamping means, said chamber means, in combination with said second clamping means, defining a closed flow path adapted to communicate with and extend away from a sample of material, the permeability of which is to be tested;
means to withdraw fluid from said chamber means;
means to measure the rate at which fluid is withdrawn from said chamber means;
means to measure a fluid pressure differential across a sample of material when said sample is clampingly engaged on opposite sides by said first and said second clamping means;
wall means connected with and projecting upwardly from said first clamping means and defining a passageway having an open upper end and affording direct observation, through said open upper end, of the portion of a sample within the aperture of said first clamping means when said sample is clamped between said first and second clamping means; and
platform means supporting said other clamping means at a fixed, predetermined position and providing a supporting surface surrounding said other clamping means and projecting horizontally outwardly therefrom.

3. An apparatus as described in claim 2:
wherein said lever means comprises
    a handle pivotably mounted on said cantilevered frame means,
    an actuating lever pivotably mounted on said cantilevered frame means and engageable with said abutment defining rod, and
    a linkage pivotably connected to each of said handle and said actuating lever; and
wherein said locking means comprises
    an abutment carried by said linkage and adapted to abuttingly engage said actuating lever so as to limit pivotable movement of said actuating lever and said handle after said actuating lever and handle have pivotably moved a predetermined extent.

References Cited by the Examiner
UNITED STATES PATENTS

| | | | |
|---|---|---|---|
| 2,157,135 | 5/1939 | Little | 73—38 |
| 2,751,779 | 6/1956 | Hodson | 73—38 |
| 2,861,451 | 11/1958 | Emmons | 73—38 |
| 3,111,836 | 11/1963 | Emmons | 73—38 |
| 3,184,957 | 5/1965 | Ellis | 73—38 |

LOUIS R. PRINCE, *Primary Examiner.*

DAVID SCHONBERG, F. H. THOMSON,
    *Assistant Examiners.*